United States Patent

Mita et al.

[11] 3,838,624
[45] Oct. 1, 1974

[54] HYDRAULIC STEERING BRAKE FOR TRACTOR

[75] Inventors: Masazo Mita; Akihiro Toyomura; Yutaka Ogawa; Masatsugu Nagatomo, all of Osaka, Japan

[73] Assignee: Kabushiki Kaisha Komatsu, Tokyo, Japan

[22] Filed: July 31, 1973

[21] Appl. No.: 384,303

[30] Foreign Application Priority Data
Sept. 22, 1972 Japan............................ 47-109572

[52] U.S. Cl............................ 91/1, 92/63, 92/65, 188/170, 303/6 M
[51] Int. Cl........................ F01b 25/26, F01b 7/00
[58] Field of Search.............. 91/1, 170, 178; 92/63, 92/64, 65, 5; 303/6 M, 6 A; 188/170; 137/596

[56] References Cited
UNITED STATES PATENTS

| | | | |
|---|---|---|---|
| 2,809,723 | 10/1957 | Howze | 303/6 M |
| 3,181,426 | 5/1965 | Ike | 91/170 R |
| 3,196,618 | 7/1965 | Farmery et al. | 92/5 R |
| 3,515,438 | 6/1970 | Stevenson et al. | 91/170 R |
| 3,736,842 | 6/1973 | Valentine | 91/1 |

Primary Examiner—Irwin C. Cohen
Assistant Examiner—A. M. Zupcic
Attorney, Agent, or Firm—Armstrong, Nikaido & Wegner

[57] ABSTRACT

A hydraulic steering brake for a tractor having a steering lever or brake pedal, a linkage, and a brake lever engaged with a brake band. The brake has a control valve connected through the linkage to the steering lever or brake lever or brake pedal. A hydraulic cylinder connected to the control valve operates the brake lever connected to the brake band. Thus, the adjustment of the brake is almost not necessary due to the wear of the brake lining.

7 Claims, 6 Drawing Figures

HYDRAULIC STEERING BRAKE FOR TRACTOR

BACKGROUND OF THE INVENTION

1. Field of the Invention

This invention relates to a hydraulic steering brake for a tractor such as a bulldozer.

2. Description of the Prior Art

The steering brakes for a tractor such as a bulldozer generally use a contractable band brake so constructed that a steering lever is drawn or a brake pedal is depressed so as to move the brake lever provided within a brake housing in order to tighten the outer cylinder of the steering clutch in such a manner that the steering brake is interlocked in operation with the steering clutch. When the steering lever is drawn, the steering clutch is first disengaged and the steering brake is then operated.

The conventional steering brake generally accommodates a mechanical brake in which a steering lever or brake pedal is connected to the brake lever by a linkage, and the force necessary for the brake is provided by the drawing force of the steering lever or the depressing force of the brake pedal by the driver of the tractor. Accordingly, if the brake lining is worn, or brake band is slackened, the stroke of the steering lever or brake pedal is varied so that the relationship between the braking force of the brake and the stroke of the steering lever or brake pedal is varied. This results in not only abnormal operation of the steering brake interlocked to the steering clutch, but the braking force of the heavy tractor becomes insufficient because the braking force depends upon the drawing force of the steering lever or the depressing force of the brake pedal by the driver. Yet even if a followup type hydraulic booster is mounted to reinforce the operating force, a great deal of operating force is necessary for stopping the vehicle or tractor because hydraulic pressure is removed when the engine of the tractor is stopped. The result is that it is very difficult to stop the engine of the vehicle and still use the brake.

SUMMARY OF THE INVENTION

This invention contemplates eliminating the aforementioned disadvantages of the conventional steering brakes for a tractor and to provide a novel hydraulic steering brake of a tractor.

It is, therefore, an object of the present invention to provide a hydraulic steering brake for a tractor which greatly reduces the operating force of the steering lever or brake pedal.

It is another object of the present invention to provide a hydraulic steering brake for a tractor which practically eliminates the adjustment of the brake due to the wear of the brake lining.

It is a further object of the present invention to provide a hydraulic steering brake for a tractor which provides a large gap between the brake drum and the brake lining sufficient to preserve the loss of power in operation.

It is still another object of the present invention to provide a hydraulic steering brake for a tractor which does not require a great amount of operating force of the brake even when the engine is stopped or the hydraulic system is damaged.

It is still another object of the invention to provide a hydraulic steering brake for a tractor in which the brake pedal may be fully depressed after the engine is stopped to maintain the braked state even if the brake pedal is then released.

According to one aspect of the present invention, there is provided a hydraulic steering brake for a tractor having a brake pedal or steering lever with a linkage connected to said lever or pedal at one end thereof, a source of hydraulic pressure, and a brake lever engaged with a brake band. A control valve means is connected through said linkage to said steering lever or brake pedal for controlling the steering brake by the operation of said lever or pedal, and a hydraulic cylinder means is connected to the control valve and also to the steering brake for operating the brake lever connected to the brake band of the steering brake. The control valve has a hollow valve body including a first port formed at the middle portion which communicates with said source of hydraulic pressure. Second and third ports are formed on both sides of said first port, and first and second drain ports are formed at both side ends of the valve in such a manner that the first port communicates with the second port through a first passage formed therein. A first hollow spool is axially slidably inserted into said hollow valve body so that one end thereof is exposed out of said valve body for controlling said second port. A rod is axially slidably inserted into said first spool with a stepped portion formed at the middle portion thereof in engagement with the exposed end of said first spool. A first resilient member is disposed inside said first spool around said rod for urging said first spool and rod against axial movement. A second spool is axially slidably inserted into said hollow valve body in engagement at one end thereof with said first resilient member for controlling said third port. An intermediate landing is formed thereon for controlling said third port and an end recess portion is formed at the other end of said second spool. A second resilient member is disposed inside of said hollow valve body around the end recess portion of said second spool for urging said second spool against the axial movement of said first spool and said rod.

The hydraulic cylinder means has a cylindrical body, a partition wall for dividing said body into front and rear chambers, and a piston axially slidably disposed within said front chamber. A piston rod is connected at one end thereof to said piston and passes through said partition wall and valve body and is connected at the other end to the end of said brake lever. A first chamber is formed between said partition wall and said piston, the chamber communicating with the third port of said control valve through a second passage. A free piston is slidably axially disposed within said rear chamber on said piston rod, said free piston having an axial projection integrally projecting therefrom, which passes through said partition wall, thereby forming a second chamber between the partition wall and said free piston which communicates with said second port of said control valve through a third passage formed in said body.

A third resilient member is axially mounted between said free piston and said cylinder body, and a fourth resilient member is mounted between said free piston and the middle portion of said piston rod within said cylinder body.

In another feature of the present invention, the control valve further comprises a hollow end landing formed at the forward end of said second spool. A fifth resilient member is axially disposed within the hollow end landing, and an inside spool is slidably disposed into the hollow end landing of said second spool urged by said fifth resilient member against the axial movement of said rod on one side and pushed by said rod on the other to urge said second spool to provide communication between said third port of said valve body and said first port of said valve body. The first port communicates with the source of hydraulic pressure, thus the piston disposed in the front chamber of said hydraulic cylinder means is urged to operate said steering brake through said piston rod connected to said piston against the tension of said fourth resilient member of said cylinder means. The control valve further comprises a hollow end recess portion formed at the rear end of said second spool and a fourth passage formed at the intermediate landing of said second spool for connecting said third port of said valve body with the inside of the hollow end recess portion of said second spool. A packing is disposed within said hollow end recess portion of said second spool supported by said valve body at the rear end thereof to form a third chamber therein for increasing the hydraulic pressure in said third port of said valve body, the third port communicating with the first chamber of said hydraulic cylinder means. The pressure increase is proportional to the axial movement of said rod to enhance the braking force of said steering brake and vice-versa. A cutout is formed at the outer peripheral end of said first spool of said control valve to drain the second port of said valve body which communicates with the first port, which communicates with the third port, which communicates with the second chamber of said cylinder means. This urges said piston to operate said steering brake against the tension of said fourth resilient member. A manual pump is connected to the middle portion of said second passage between the second port of said control valve and said second chamber of said hydraulic cylinder means to raise the hydraulic pressure of said second chamber to manually release said steering brake. A sensor is provided in said cylinder body of said hydraulic cylinder means with a warning means connected thereto for warning of excessive wear of the brake lining of said steering brake.

BRIEF DESCRIPTION OF THE DRAWINGS

A more complete explanation of the present invention will be readily obtained as the same becomes better understood by reference to the following detailed description when taken in conjunction with the accompanying drawings, wherein.

DETAILED DESCRIPTION OF THE PREFERRED EMBODIMENTS

Figure 1:
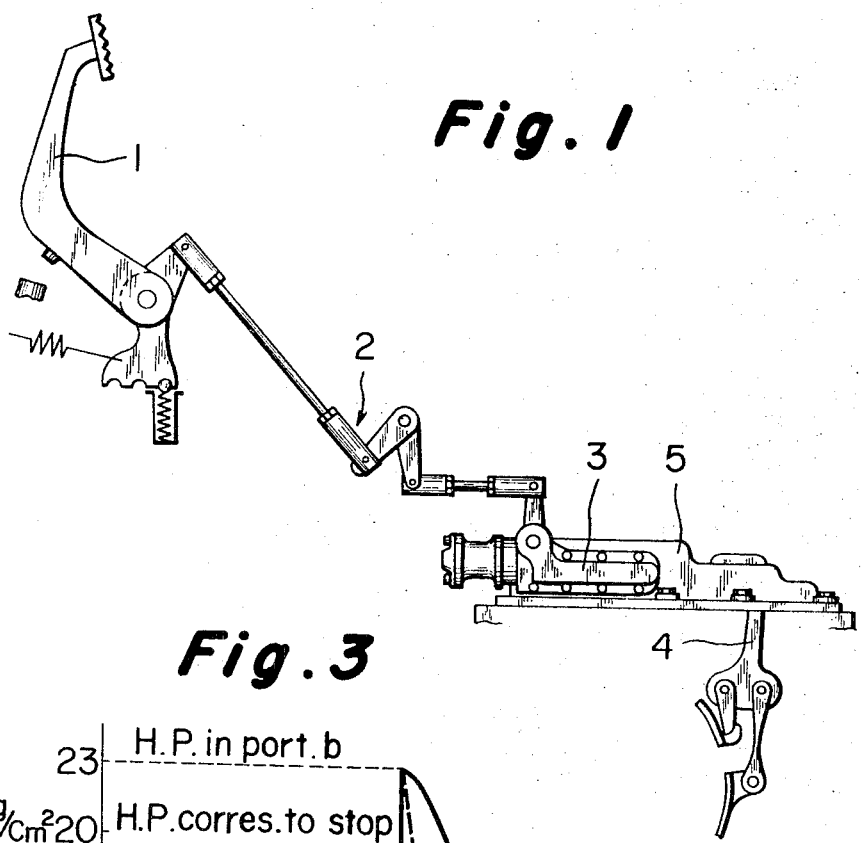
FIG. 1 is a schematic view of a hydraulic steering brake system of a tractor of the present invention.

Reference is now made to the drawings, wherein like reference numerals designate identical, or corresponding parts in all the figures.

Referring to FIG. 1, the hydraulic steering brake of a tractor of the invention is shown. Brake pedal 1 is connected through a linkage 2 to a control valve 3, which is connected to control a hydraulic cylinder 5 for operating a brake lever 4 connected to a brake band (not shown).

Figure 2:
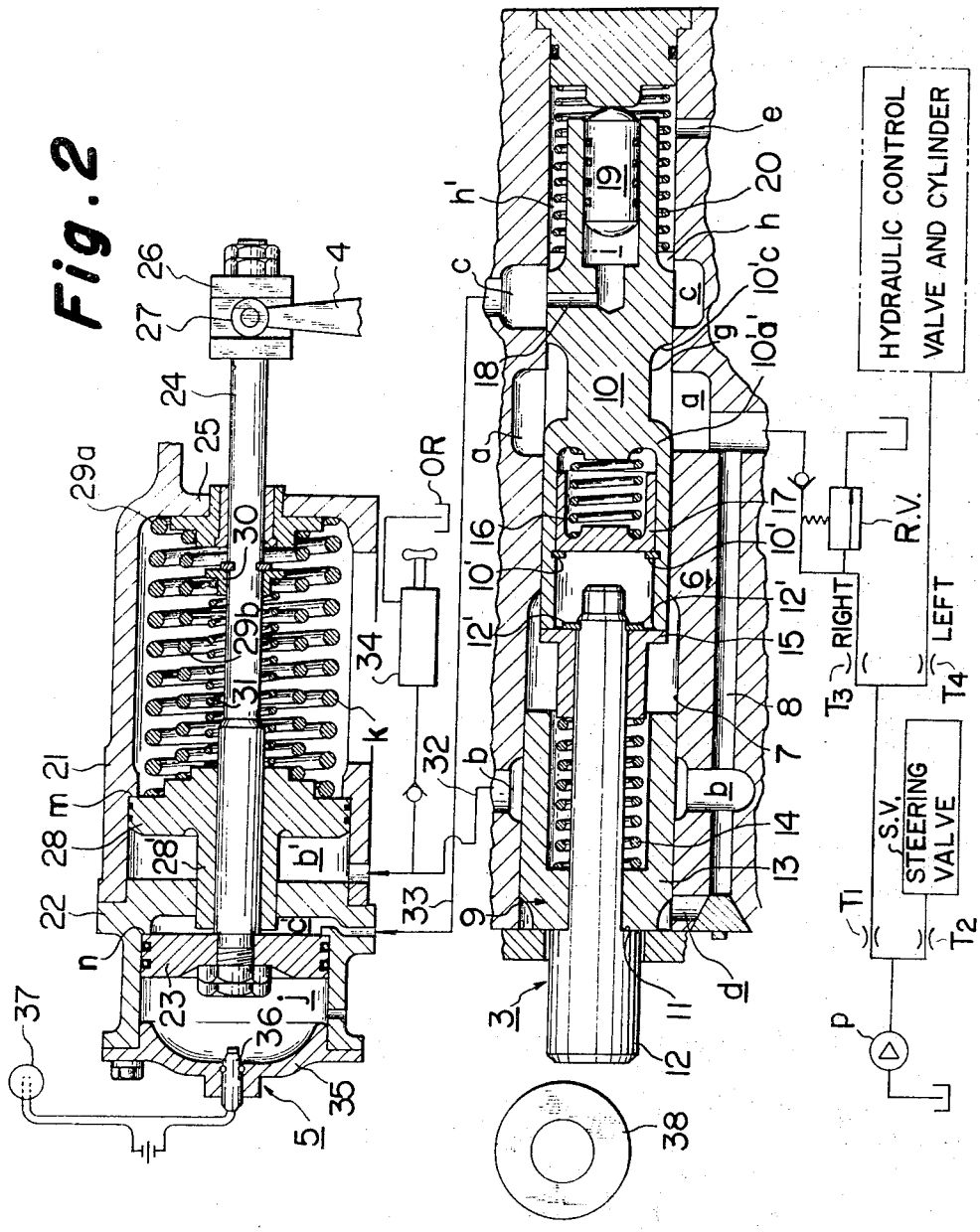
FIG. 2 is a partial sectional view of the control valve and the hydraulic cylinder used in the hydraulic steering brake system of the present invention.

Referring now to FIG. 2, which shows one embodiment of the right and left symmetrical control valves and the hydraulic cylinders used in the hydraulic steering brake of the present invention, in which only right side is shown for explanatory purpose, but both operate in the same way, a hole 7 is formed through valve body 6 of the control valve 3. The valve body has a port a at the middle thereof which communicates with a source of hydraulic pressure $p$. Two ports b and c are formed at both sides of the port a, and drain ports d and e formed at both side ends thereof in such a manner that the port a communicates with port b through a passage 8 formed in the body 6. Two spools 9 and 10 are axially slidably inserted into the hole 7 of the valve body 6 for controlling the port b and drain port d, and the port a and port c, respectively.

[From the source of hydraulic pressure $p$, hydraulic fluid is fed through a throttle T1 to the control valves and the hydraulic cylinders as will be hereinafter described in greater detail, and is also fed through a throttle T2 to a steering valve S. V. in the hydraulic steering system of the tractor. The hydraulic fluid fed through the throttle T1 is fed through a throttle T3 to the right control valve and hydraulic cylinder in the hydraulic steering brake as will be hereinafter described in greater detail, and is also fed through a throttle T4 to the left control valve and hydraulic cylinder (not shown) in the hydraulic steering brake, which is omitted because the construction thereof is the same as that of the right control valve and hydraulic cylinder.]

The hollow spool 9 is exposed at one end out of the valve body 6, and rod 12 is axially slidably inserted into the spool 9. The rod 12 has a stepped portion 11 in the middle thereof which engages the exposed end of the spool 9. A piston portion 13 is formed integrally with the spool 9 and slidably engages the stepped portion 11 of the rod 12 around the rod 12. The piston 13 contacts the port b of the valve body 6, and the piston portion 13 has a cutout f provided at the outer peripheral end of the spool 9. A coil spring 14 is disposed inside the spool 9 around the rod 12 and a spacer 15 is urged at one end with the spring 14 and contacted at the other end with the one end of the spool 10 around the rod 12 and also with the stopper 12' fixed to the end of the rod 12.

The spool 10 is formed to have a hollow end landing 10a' for controlling fluid in the port a of the valve body 6. An intermediate landing 10c' controls fluid in the port c of the valve body 6. An intermediate annular recess portion g between the landings 10a' and 10c', and a cutout h with a hollow end recess portion h' are formed at the right side end of the spool 10 adjacent to the intermediate landing 10c'. Inside the hollow end landing 10a' of the spool 10 is a coil spring 16 supported at one end on the bottom of the hollow end landing 10a' and an inside spool 17 slidably inserted into the hollow end landing 10a' of the spool 10. The spool 17 is urged to the left by the spring 16 and stopped by a stopper 10' fixed to the inside of the hollow end landing 10a' opposite to the end of the rod 12 slidably inserted into the hollow spool 9. A passage 18 is formed at the middle of landing 10c' to communicate the port c of the valve body 6 with a chamber $i$ inside the hollow end recess portion $h'$ of the spool 10. A packing 19 is sealingly inserted into the hollow end recess portion $h'$ of the spool 10 and is supported by the end of the valve body 6, and a spring 20 is inserted inside the hole 7 of the valve body 6 around the hollow end recess portion $h'$ of the spool 10. The spring 20 urges the spool 10 to the left.

The hydraulic cylinder means 5 has a cylinder body 21 and a partition wall 22 for dividing the cylinder body 21 into front and rear chambers $j$ and $k$. In the front chamber $j$ is a piston 23, to which a piston rod 24 is connected at one end thereof. The rod 24 passes through the partition wall 22 and rod cover 25 of the cylinder body 21 and is connected at the other end to the end of the brake lever 4 by means of a block 26. A roller 27 connected to block 26 is provided at the end of the brake lever.

In the rear chamber $k$ of the cylinder means 5 is provided a free piston 28 slidably mounted on the front end of the piston rod 24 within the rear chamber $k$ by the axial projection 28'. Projection 28' also passes through partition wall 22 and contacts the piston 23. Piston 28 slidably contacts the inner periphery of the cylinder body 21 in the rear chamber $k$. The leftward sliding movement of the free piston 28 is stopped by the stopper m steppedly formed on the inner periphery of the cylinder body 21 of the cylinder means 5. Outer and inner coil springs 29a and 29b are axially mounted between the rear end surface of the free piston 28 and the rod cover 25 of the cylinder means 5 around the piston rod 24 within the rear chamber $k$. An innermost coil spring 31 is also provided axially between the rear end surface of the free piston 28 and a bracket 30 fixed to the middle of the piston rod 24 in the rear chamber $k$.

The partition wall 22 is recessed at the front side surface so as to form a chamber $c'$ together with the rear side surface of the piston 23 in such a manner that the rightward movement of the piston 23 is stopped at the inner peripheral edge n of the partition wall 22. A chamber $b'$ is formed between the partition wall 22 and the free piston 28. The chamber $b'$ communicates through a passage 32 with the port $b$ of the control valve 3, and the chamber $c'$ communicates through a passage 33 with the port c of the control valve 3. A manual pump 34 is connected to the middle portion of passage 32 connecting the port b of the control valve 3 with the chamber $b'$ of the hydraulic cylinder means 5. A sensor 36, such as a microswitch, is provided at the cylinder cover 35 of the cylinder body 21 at the left end of the cylinder means 5, and is connected to a warning device 37 for warning of excessive wear of the brake lining.

In operation of the hydraulic steering brake of a tractor of this invention, reference is made to FIGS. 3 to 6, which show a graphic representation and various operational states of the control valve and the hydraulic cylinder means of the steering brake of this invention as one embodiment.

1. When brake pedal is not depressed:

When the brake pedal 1 is not depressed or is free, a roller 38, provided at the end of the linkage 2 connected to the brake pedal 1, is separated from the end of the rod 12 slidably inserted into the spool 9 of the control valve 3. Therefore, the spools 9 and 10 are urged by the springs 14 and 20, respectively, to the left so that the control valve 3 is in the state as shown in FIG. 2. Accordingly, hydraulic fluid, from a source of hydraulic pressure $p$, is fed into the port a of the valve body 6 of the control valve 3 and to port $b$ through the passage 8 of the valve body 6 of the control valve 3. Also fluid is fed through the passage 32 into the chamber $b'$ of the hydraulic cylinder means 5 so as to urge the free piston 28 to the right against the tension of the springs 29a and 29b until the free piston 28 is stopped by the stopper m of the cylinder body 21. The port c of the valve body 6 of the control valve 3 is isolated from the intermediate annular recess portion g of the spool 10 of the control valve 3, and communicates with the cutout h and hollow end recess portion $h'$ formed at the right side end of the spool 10. The recess portion $h'$ communicates with the drain port 3 of the valve body 6 of the control valve 3, and accordingly the port c of the valve body 6 of the control valve 3 and the chamber $c'$ of the hydraulic cylinder means 5 which communicates with the port c through the passage 33 are drained so that the hydraulic pressure becomes zero. As a result, the piston 23 within the chamber $j$ of the hydraulic cylinder means 5 moves to the right under the tension of the spring 31 until the piston 23 is stopped by the stopper $m$ formed on the inner periphery of the cylinder body 21 of the cylinder means 5. The result is that the hydraulic cylinder means 5 completely releases the steering brake as shown in FIG. 2.

A relief valve RV is provided in the hydraulic circuit from the source of hydraulic pressure $p$ to the port a of the valve body 6 of the control valve 3 just before the port $a$, and therefore, the hydraulic pressure of the port a, port b which communicates through the passage 8, with the port $a$, and the chamber $b'$ of the cylinder means 5 which communicates, through the passage 32, with the port b of the control valve 3 is raised to the set pressure of the relief valve RV. Excessive hydraulic fluid from the source of hydraulic pressure p is drained through the relief valve RV.

2. When the brake pedal is depressed by a stroke in the range of 0 to 50mm (within the play of the brake pedal):

Since the roller 38 provided at the end of the linkage 2 connected to the brake pedal 1 does not contact the end of the rod 12 slidably inserted into the spool 9 of the control valve 3, when the brake pedal 1 is depressed within this range of 0 to 50mm, the state of the control valve 3 and the hydraulic cylinder means 5 are the same as those described in the above paragraph 1.

Figure 4:
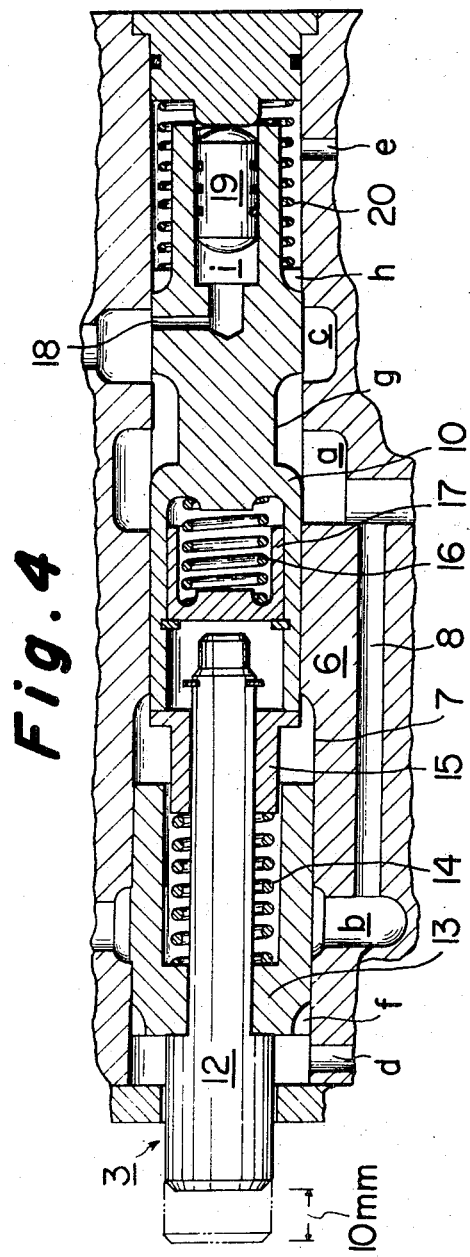
FIGS. 4, 5 and 6 are partial sectional views of the control valve used in the hydraulic steering brake system in various operational states.
Figure 5:
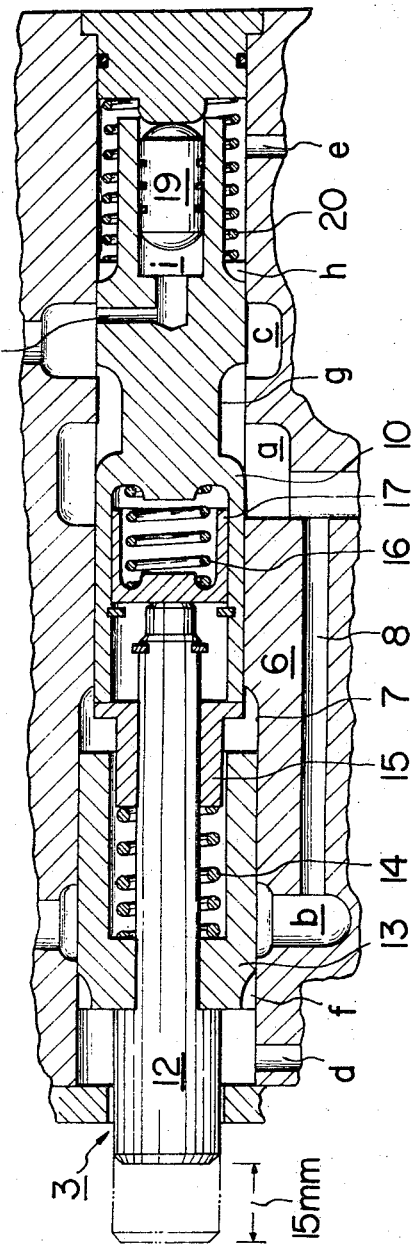

3. When the brake pedal is depressed in the range of 50 to 100mm of the stroke (slow braking):

When the brake pedal 1 is depressed in the range of 50 to 100mm, the roller 38 provided at the end of the linkage 2 connected to the brake pedal 1 pushes the end of the rod 12 slidably inserted into the spool 9 of the control valve 3 in the range of 0 to 10mm. The control valve 3 then is in the state as shown in FIG. 4. As the rod 12 is pushed slidably into the spool 9 of the control valve 3, the spool 9 is also integrally pushed to the right into the hollow valve body 6 in such a manner that the rod 12 pushes the spool 9 through the stepped portion n at the middle portion thereof against the spring 14 disposed inside the spool 9 around the rod 12. As the spool 9 is thus pushed to the right against the spring 14, the spool 10 slidably inserted into the hole 7 of the valve body 6 of the control valve 3 is urged to the right through the spring 14 and the spacer 15 which contacts one end of the spool 10 around the rod 12 of the control valve 3.

As the spool 10 is thus moved to the right, the port c of the valve body 6 of the control valve 3 communicates with the port a, which communicates with the source of hydraulic pressure p, through the intermediate annular recess portion g formed on the spool 10. The port c does not communicate with the cutout h and hollow end recess portion h' formed at the right side end of the spool 10 and thus communication with the drain port e is shut off. Accordingly, the hydraulic fluid in the port a from the source of hydraulic pressure p is fed through the intermediate annular recess portion g formed on the spool 10, the port c communicating with the annular recess portion g, and the passage 33 into the chamber c' of the hydraulic cylinder means 5 so as to urge the piston 23 to the left against the tension of the spring 31. The spring 31 is provided axially between the rear end surface of the free piston 28 and the bracket 30 fixed at the middle portion of the piston rod 24 in the rear chamber k of the hydraulic cylinder means 5. The result is that the roller 27 slidably held at the end of the brake lever 4 is also moved to the left by the piston rod 24 fixed to the piston 23, thereby operating the steering brake.

In addition, since the chamber i formed inside of the hollow end recess portion h' of the spool 10 of the control valve 3 communicates through the passage 18 with the port c, the hydraulic pressure of the chamber i becomes the same as that of the port c with the result that the spool 10 is pushed to the left in such a manner that the sliding movement of the spool 10 is controlled by the relationship between the tension of the spring 14 urged by the rod 12 at one end thereof and through the spacer 15, and the hydraulic pressure in the chamber i for urging the spool 10 in the opposite direction.

Figure 3:
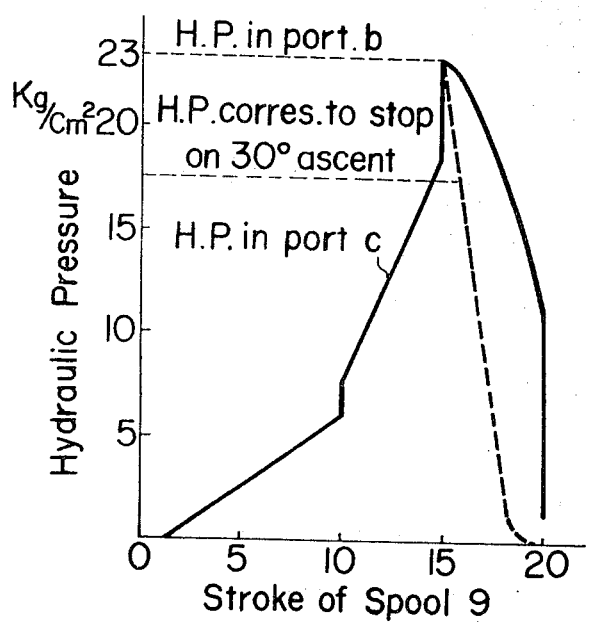
FIG. 3 is a graph showing the relationship between the stroke of the spool of the control valve and a particular port of the control valve.

FIG. 3 shows a graphical representation of the relationship between the stroke of the spool 9 and the hydraulic pressure in the hydraulic circuit of the steering brake. The hydraulic pressure of the chamber c', formed between the piston 23 and the partition wall 22 of the hydraulic cylinder means 5, communicates through the passage 18 with the chamber i. The stroke of the spool 9, that is, the tension of the spring 14 maintains a constant relation therebetween. The hydraulic pressure of the port b communicated through the passage 8 and the port a with the source of hydraulic pressure p is set by the relief valve RV and communicates with the chamber b' of the hydraulic cylinder means 5 through the passage 32. The free piston 28 in the chamber k of the hydraulic cylinder means 5 holds the position as shown in FIG. 2 in such a manner that the springs 29a and 29b axially mounted between the rear end surface of the free piston 28 and the rod cover 25 of the cylinder means 5 so as not to move the piston rod 24 and accordingly not to operate the steering brake.

When the brake pedal l is returned while in the range of 50 to 100mm, the spool 9, in contact with the roller 38 provided at the end of the linkage 2 connected to the brake pedal l, is urged to the left by the tension of the spring 14 and also by the tension of the spring 20 through the spool 10 and the spacer 15 provided between the spring 14 and the spool 10. The tension of the springs 14 and 20 is weakened with the result that the hydraulic pressure in the chamber i becomes the pressure corresponding to the tension of the weakened spring 14, and accordingly, the fine operation of the brake pedal l corresponds to the braking force of the steering brake.

Then, when the brake pedal l is returned to the 50mm position, the roller 38 is returned to the position where it does not push the rod 12 against the tension of the springs 14 and 20, thus returning to the state shown in FIG. 2. Accordingly, the chamber c, which communicates with port a through the annular recess portion g of the spool 10, is shut off again from the port a and communicates with the cutout h and hollow end recess portion h' of the spool 10 which communicates with the drain port e. The chamber c' of the cylinder means 5, which communicates through the passage 33 with the port c, is drained so that the piston 28 is moved back to the right and accordingly, the piston rod 24 integrally provided with the piston 23 is also moved to the right to disengage the steering brake through the roller 27 slidably held at the end of the brake lever 4. The result is that the braking force of the steering brake becomes zero.

4. When the brake pedal is depressed in the range of 100 to 125mm of the stroke (quick braking):

When the brake pedal l is depressed in the range of 100 to 125mm, the roller 38 provided at the end of the linkage 2 connected to the brake pedal l pushes the end of the rod 12 slidably inserted into the spool 9 in the range of 10 to 15mm. The control valve 3 is then in the state shown in FIG. 5. As the rod 12 is pushed slidably into the spool 9 of the control valve 3 by the brake pedal l via the roller 38, the spool 9 is also integrally pushed into the hollow valve body 6. This causes the rod 12 to push the spool 9 through the stepped portion n at the middle portion thereof against the spring 14 disposed inside the spool 9 around the rod 12. In addition, the rear end of the rod 12 pushes the forward end of the spool 17 to the left against the spring 16. The stopper 10' fixed on the inside of the middle portion of the hollow end landing 10a' urges the spool 10 under the tension of spring 16 to the right. Accordingly, the hydraulic pressure of the chamber i formed inside of the hollow end recess portion h' of the spool 10, which communicates with the port c through the passage 18 and communicates with the chamber c' through the passage 33, quickly increases as shown in FIG. 3. This balances with the tension of the springs 14 and 16 in response to the stroke of the spool 9. As the hydraulic pressure in the chamber c' of the hydraulic cylinder means 5 is thus increased, the piston 23 in the chamber j of the cylinder means 5 is urged to the left against the tension of the spring 31 provided axially between the rear end surface of the free piston 28 and the bracket 30 fixed at the intermediate portion of the piston rod 24 in the rear chamber k of the hydraulic cylinder means 5. The result is that the roller 27 slidably held at the end of the brake lever 4 is accordingly further moved to the left so as to increase the braking force of the steering brake.

Figure 6:
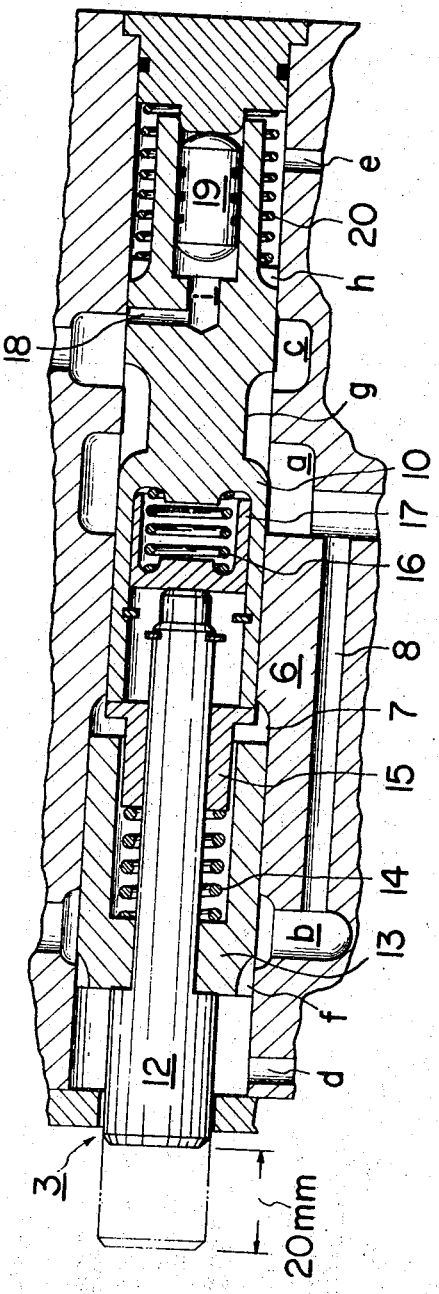

5. When the brake pedal is depressed in the range of 125 to 150mm of its stroke (emergency braking):

The brake pedal l is not necessarily depressed over 125mm in the ordinary operation of the tractor, but when the brake pedal l is depressed in the range of 125 to 150mm, the roller 38 provided at the end of the linkage 2 connected to the brake pedal l pushes the end of the rod 12 over 15mm, and the control valve 3 is in the state as shown in FIG. 6. As the rod 12 is thus pushed slidably into the spool 9 of the control valve 3 by the brake pedal l via the roller 38, the spool 9 strongly urges the spring 14 and thereby the spring 16 by the rear end of the rod 12 in such a manner that the rod 12 pushes the spool 17 to the right. Accordingly, the hydraulic pressure of the chamber i greatly increases as shown in FIG. 3, while the cutout f formed at the outer peripheral end of the spool 9, which communicates with the drain port d of the valve body 6 communicates with the port b which communicates through the passage 32 with the chamber b'. The result is that the chamber b' of the hydraulic cylinder means 5 is drained therethrough.

As the chamber b' of the cylinder means 5 is thus drained, the free piston 28 slidably mounted at the front end of the piston rod 24 within the rear chamber k is urged to the left by the springs 29a and 29b axially mounted between the rear end surface of the free piston 28 and the rod cover 25 of the cylinder means 5. Projection 28' of the pistion 28 thereby urges the piston 23 to the left of the drawing.

On the other hand, since the chamber c' of the hydraulic cylinder means 5 communicates with the port b of the control valve 3 through the passage 33 and port c communicates with the port a through the intermediate annular recess portion g of the spool 10 and port a with the port b through the passage 8, the hydraulic pressure of the chamber c' is also drained to become zero. However, if the hydraulic resistance of the hydraulic circuit for connecting the chamber c' to the port c such as by the passage 33 is larger than the circuit for connecting the chamber b' to the port b, the hydraulic pressure of the chamber b' becomes zero prior to that of the chamber c' with the result that before the braking force by the hydraulic pressure of the chamber c' reaches zero, the braking force by the piston 23 urged by the free piston 28 under the tension of the springs 29a and 29b starts to act on the steering brake, and therefore, the steering brake is not released during emergency braking.

6. When the engine is stopped, or hydraulic circuit is damaged:

When the engine of the tractor is stopped or the hydraulic circuit of the steering brake of the tractor is damaged during travelling, the hydraulic fluid from the source of hydraulic pressure p is not fed through the port a of the valve body 6. Thus, the port c communicating with port a through the annular recess portion g of the spool 10 and the passage 33 to the chamber c', are not pressurized. In this case, if the brake pedal l is depressed over 125mm, the hydraulic pressure of the port a, port c and the chamber c' become zero in a similar operation to that as described in the above paragraph 5, and the braking force by the piston 23 urged by the free piston 28 under the tension of the springs 29a and 29b is provided for the steering brake to automatically operate the steering brake as was described similarly to the case of the above paragraph 5.

When the tractor is parked, if the brake pedal l is fully depressed after the engine is stopped, the steering brake is operated similarly to the above operation.

7. Release of the brake when the steering brake is operated by means of the springs 29a and 29b:

If the steering brake is operated by means of the springs 29a and 29b, such as when the engine is stopped or hydraulic circuit of the steering brake is damaged, or the tractor is parked, in order to release the steering brake, the engine of the tractor is first started to produce hydraulic pressure. Then, the hydraulic pressure is fed from the source of hydraulic pressure p through the port a, the passage 8 communicating with the port a, the port b to the chamber b' of the hydraulic cylinder means 5. This urges the free piston 28 to the right against the springs 29a and 29b. But if the engine or hydraulic circuit is damaged, a manual pump 34 connected to the passage 32 communicating with the chamber b' of the cylinder means 5 and with an oil reservoir OR is manually operated so as to raise the hydraulic pressure of the chamber b' to similarly operate as above to release the steering brake.

8. Sensor and warning device:

If the brake lining (not shown) of the steering brake is worn so that the gap between the brake drum (not shown) and the brake lining (not shown) becomes large, the sliding movement of the piston rod 24 becomes greater than normal, and the sensor 36 provided on the cylinder cover 35 of the cylinder body 21, and connected to the warning device 36, is urged by the head of the piston rod 24. This occurs because the roller 27 held at the end of the brake lever 4 which moves more than normal to the left, due to the larger gap between the brake drum and the brake lining. When the sensor 36 is urged by the piston rod 24 due to the excessive wear of the steering brake, the warning device 37 warns of the excessive wear of the brake lining to prevent a dangerous accident thereby.

It should be understood from the foregoing description that the hydraulic steering brake of the tractor of this invention has a control valve 3 connected through the linkage 2 to the steering lever or brake pedal l for controlling the steering brake by the operation of the lever or pedal 1. A hydraulic cylinder means 5 is connected to the control valve 3 and also to the steering brake for operating the brake lever 4 connected to the brake band of the steering brake in such a manner that when the brake pedal l is fully depressed, the steering brake is operated by the springs 29 provided therein without regard to the hydraulic pressure of the hydraulic circuit of the steering brake. This arrangement provides and effects:

a. The stroke of the brake lever or brake pedal is not affected by the wear of the brake lining, and accordingly, the adjustment of the brake to compensate for the wear of the brake lining is almost eliminated. Further, even though the relationship between the stroke of the brake pedal l and the braking force becomes, as shown in FIG. 3, the relationship between the stroke of the spool 9 of the control valve 3 and the hydraulic pressure of the port c of the control valve 3 are constant.

b. Since the steering brake is operated hydraulically, the depressing force of the brake pedal l is not related to the braking force, but is enough only for moving the spool 9 of the control valve 3, thereby greatly reducing the depressing force of the driver of the tractor.

c. Since the gap between the brake lining and the brake drum is not related to the stroke of the brake pedal l, the gap may be sufficiently provided without losing the power of the steering brake and eliminating the conventional disadvantage that the steering brake is engaged before the steering clutch is disengaged so as to slowly turn the tractor.

d. Even if the engine of the tractor is stopped or the hydraulic circuit of the steering brake is damaged, the tractor may be instantaneously stopped only by fully depressing the brake pedal l by means of the springs 29 contained in the hydraulic cylinder means 5, thereby preventing an accident without necessity of large operating force on the steering brake.

e. In parking the tractor, only the brake pedal l is fully depressed after the engine is stopped, and after the brake pedal is once depressed, the tractor remains braked even if the pedal is released.

We claim:

1. A hydraulic steering brake for a tractor having a brake pedal or steering lever, a linkage connected to said lever or pedal at one end thereof, a source of hydraulic pressure, and a brake lever engaged with a brake band, said brake comprising:
   a control valve means connected through said linkage to said steering lever or brake pedal for controlling the steering brake by the operation of said lever or pedal, and
   a hydraulic cylinder means connected to said control valve means and to the steering brake for operating the brake lever connected to the brake band of said steering brake, and wherein said control valve means comprises:
   a hollow valve body including a first port formed at the middle portion thereof, said first port communicating with said source of hydraulic pressure, second and third ports formed at both sides of said first port, and first and second drain ports formed at both both side ends thereof, wherein said first port communicates with the second port through a first passage formed in said valve means,
   a first hollow spool axially slidable within said hollow valve body for controlling said second port,
   a rod axially slidably fixed to said first spool, said rod having a stepped portion formed at the middle portion thereof in engagement with the end of said first spool,
   a first resilient member disposed inside said first spool around said rod for urging said first spool against the axial movement of said first spool and said rod,
   a second spool axially slidably fixed to said hollow valve body engaged at one end thereof with said first resilient member and including an intermediate landing formed thereon for controlling said third port, said second spool having an end recess portion formed at the other end thereof, and
   a second resilient member disposed inside of said hollow valve body around the end recess portion of said second spool for urging said second spool against the axial movement of said first spool and said rod.

2. The hydraulic steering brake of claim 1, wherein said hydraulic cylinder means comprises:
   a cylinder body,
   a partition wall for dividing said body into front and rear chambers,
   a piston axially slidably disposed within said front chamber,
   a piston rod connected at one end thereof to said piston, said piston rod passing through said partition wall and said valve body and connected to the end of said brake lever,
   a first chamber formed between said partition wall and said piston, said first chamber communicating with the third port of said control valve means through a second passage,
   a free piston slidably axially disposed within said rear chamber on said piston rod, said free piston having an axial projection integrally projected therefrom and passing through said partition wall, said free piston forming a second chamber between the partition wall and said free piston which communicates with said second port of said control valve through a third passage formed in said body,
   a third resilient member axially mounted between said free piston and said cylinder body, and
   a fourth resilient member mounted between said free piston and the middle portion of said piston rod within said cylinder body.

3. A hydraulic steering brake for a tractor according to claim 2, wherein said control valve means further comprises:
   a hollow end landing formed at one end of said second spool,
   a fifth resilient member axially disposed within the hollow end landing,
   an inside spool slidably disposed into the hollow end landing of said second spool urged by said fifth resilient member against the axial movement of said rod on one side and pushed by said rod on the other, thereby urging said second spool to connect said third port with said first port, which communicates with the source of hydraulic pressure whereby said piston disposed in the front chamber of said hydraulic cylinder means operates said steering brake through said piston rod connected to said pistion against the tension of said fourth resilient member of said cylinder means.

4. A hydraulic steering brake according to claim 2, wherein said control valve means further comprises:
   a hollow end recess portion formed at the rear end of said second spool,
   a fourth passage formed at the middle portion landing of said second spool for connecting said third port of said valve body with the inside of the hollow end recess portion of said second spool, and
   a packing seal disposed within said hollow end recess portion of said second spool supported by said valve body at the rear end thereof to form a third chamber therein for increasing the hydraulic pressure in said third port which communicates with the first chamber of said hydraulic cylinder means, the increase in hydraulic pressure being proportional to the axial movement of said rod thereby enhancing the braking force of said steering brake.

5. The hydraulic steering brake according to claim 2, wherein a cutout is formed at the outer peripheral end of said first spool to drain the second port of said valve body which communicates with the first port which communicates with the third port which communicates with the second chamber of said cylinder means, thereby urging said piston to operate said steering brake against the tension of said fourth resilient member.

6. A hydraulic steering brake according to claim 2, further comprising a manual pump connected to the middle portion of said second passage between the second port and said second chamber of said hydraulic cylinder means to raise the hydraulic pressure of said second chamber to manually release said steering brake.

7. A hydraulic steering brake according to claim 5, further comprising a sensor provided on said cylinder body of said hydraulic cylinder means, and a warning means connected to said sensor for warning of excessive wear of the brake lining of said steering brake.

* * * * *